(12) United States Patent
Lu et al.

(10) Patent No.: US 10,607,354 B2
(45) Date of Patent: Mar. 31, 2020

(54) PRODUCTION APPARATUS WITH DEPTH IMAGE DETECTION

(71) Applicant: LIPS CORPORATION, Taipei (TW)

(72) Inventors: Yen-Wei Lu, Taipei (TW); Chi-Chuan Lu, Taipei (TW)

(73) Assignee: LIPS CORPORATION, Taipei (TW)

( * ) Notice: Subject to any disclaimer, the term of this patent is extended or adjusted under 35 U.S.C. 154(b) by 0 days.

(21) Appl. No.: 16/199,979

(22) Filed: Nov. 26, 2018

(65) Prior Publication Data
US 2020/0074654 A1 Mar. 5, 2020

(30) Foreign Application Priority Data

Aug. 29, 2018 (TW) .............................. 107130125 A

(51) Int. Cl.
| | | |
|---|---|---|
| *G06T 7/55* | (2017.01) | |
| *B65G 19/22* | (2006.01) | |
| *B65G 19/02* | (2006.01) | |
| *B25J 11/00* | (2006.01) | |
| *B25J 19/02* | (2006.01) | |
| *B25J 9/00* | (2006.01) | |

(52) U.S. Cl.
CPC ............... *G06T 7/55* (2017.01); *B25J 9/0093* (2013.01); *B25J 11/0075* (2013.01); *B25J 19/021* (2013.01); *B65G 19/02* (2013.01); *B65G 19/225* (2013.01); *B65G 2201/022* (2013.01); *B65G 2203/041* (2013.01); *G06T 2207/30108* (2013.01)

(58) Field of Classification Search
CPC .............. B65G 43/08; B65G 2203/041; B65G 2203/042; B65G 2203/044; G01N 35/026; G01N 35/00603; G01N 35/00732; G06T 7/602; G06T 7/0004
USPC ........... 198/502.2; 348/46, 125, 135; 436/47
See application file for complete search history.

(56) References Cited

U.S. PATENT DOCUMENTS

| | | | |
|---|---|---|---|
| 1,826,759 A | 10/1931 | Finn | |
| 6,064,759 A * | 5/2000 | Buckley | ............... G01B 11/024 |
| | | | 348/125 |
| 6,321,904 B1 | 11/2001 | Mitchell | |
| 10,074,191 B1 * | 9/2018 | Reome | .................... G01S 17/89 |
| 2013/0038719 A1 * | 2/2013 | Canini | ............... G06K 7/10732 |
| | | | 348/135 |
| 2016/0019688 A1 * | 1/2016 | Li | ........................... G06T 17/00 |
| | | | 348/46 |
| 2016/0025756 A1 * | 1/2016 | Pollack | .................. G01N 35/04 |
| | | | 436/47 |

(Continued)

FOREIGN PATENT DOCUMENTS

| | | |
|---|---|---|
| CN | 206203360 U | 5/2017 |
| CN | 207215842 U | 4/2018 |

(Continued)

*Primary Examiner* — James R Bidwell
(74) *Attorney, Agent, or Firm* — Li & Cai Intellectual Property (USA) Office

(57) ABSTRACT

A conveying device includes a conveyor and a carrying member. The conveyor is movable along a transporting path that sequentially defines an upstream segment and a downstream segment, and an outer surface of the conveyor includes a detecting region. The carrying member is mounted on the outer surface of the conveyor. A height of the carrying member with respect to the outer surface is larger than or equal to 3 mm.

8 Claims, 11 Drawing Sheets

(56) References Cited

U.S. PATENT DOCUMENTS

| | | | |
|---|---|---|---|
| 2016/0253793 A1* | 9/2016 | Marrion | G06T 7/0008 |
| | | | 382/141 |
| 2017/0352149 A1* | 12/2017 | Franchi | G06T 7/0008 |
| 2018/0186161 A1* | 7/2018 | Morikawa | B41C 1/05 |

FOREIGN PATENT DOCUMENTS

| | | |
|---|---|---|
| JP | H11199020 A | 7/1999 |
| JP | 2001133160 A | 5/2001 |
| JP | 2015009917 A | 1/2015 |

\* cited by examiner

PRODUCTION APPARATUS WITH DEPTH IMAGE DETECTION

CROSS-REFERENCE TO RELATED PATENT APPLICATION

This application claims the benefit of priority to Taiwan Patent Application No. 107130125, filed on Aug. 29, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a conveying device, and more particularly to a production apparatus with depth image detection and a conveying device thereof.

BACKGROUND OF THE DISCLOSURE

A conveying device of conventional production apparatus mostly has a flat surface (e.g., on a conveyor belt) to carry a device under test (DUT), such as an outsole of a shoe. For example, when the conventional production apparatus is used to produce an outsole, the outsole is disposed on a surface of the conveying device. However, since the thickness of the outsole is not large, it is difficult for a camera device to distinguish the outsole from the surface of the conveying device. Accordingly, the conventional production apparatus does not have a depth image detection for the DUT (e.g., the outsole), so that the manufacturing yield and production efficiency of the DUT cannot be improved by use of the depth image detection.

SUMMARY OF THE DISCLOSURE

In response to the above-referenced technical inadequacies, the present disclosure provides a production apparatus with depth image detection and a conveying device thereof to effectively improve certain issues associated with the conveying devices of the conventional production apparatus.

In one aspect, the present disclosure provides a production apparatus with depth image detection, which includes a stand, a conveying device, and a camera device. The conveying device is disposed on the stand, and includes a conveyor and a carrying member. The conveyor is disposed on the stand and is movable along a transporting path. An outer surface of the conveyor has a detecting region, and the transporting path sequentially defines an upstream area and a downstream area. The carrying member is disposed on the outer surface of the conveyor. A projected region defined by orthogonally projecting the carrying member onto the detecting region is smaller than or equal to 60% of an area of the detecting region, and a height of the carrying member with respect to the outer surface is larger than or equal to 3 mm. The camera device is arranged above the upstream area of the conveyor. When a device under test (DUT) is disposed on the carrying member, the camera is configured to generate a depth image by capturing images of the DUT, a portion of the detecting region around the DUT, and a portion of the carrying member around the DUT.

In certain embodiments, the production apparatus further includes a spraying device and a detecting device. The spraying device is arranged above a portion of the conveyor between the upstream area and the downstream area. The spraying device is configured to spray the DUT according to the depth image. The detecting device is arranged above the downstream area of the conveyor. After the spraying device sprays the DUT, the detecting device is configured to check whether the DUT satisfies a predetermined condition.

In one aspect, the present disclosure provides a conveying device of a production apparatus with depth image detection. The conveying device includes a conveyor and a carrying member. The conveyor is movable along a transporting path. An outer surface of the conveyor has a detecting region, and the transporting path sequentially defines an upstream area and a downstream area. The carrying member is disposed on the outer surface of the conveyor, and a height of the carrying member with respect to the outer surface is larger than or equal to 3 mm.

Therefore, the production apparatus and the conveying device thereof in the present disclosure can provide the camera device to clearly recognize a device under test (e.g., an outsole) disposed on the carrying member by the cooperation of the conveyor and the carrying member, so that the manufacturing yield and production efficiency of the DUT can be improved by a depth image from the camera device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
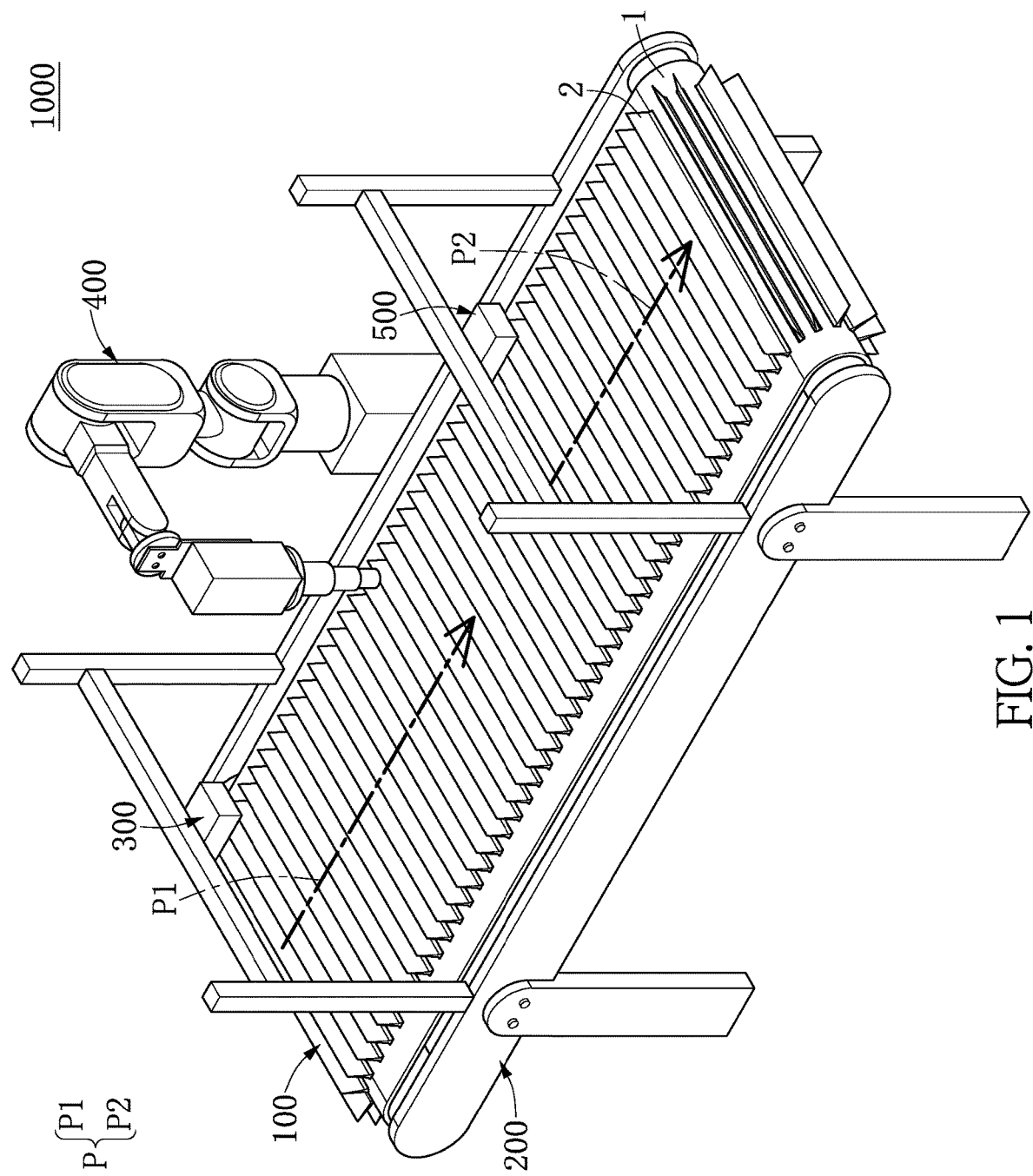
FIG. 1 is a perspective view of a production apparatus with depth image detection according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 12, an embodiment of the present disclosure provides a production apparatus 1000 with depth image detection. As shown in FIG. 1, the production apparatus 1000 in the present embodiment is an outsole production apparatus, but the present disclosure is not limited thereto. The production apparatus 1000 includes a stand 200, a conveying device 100 disposed on the stand 200, a camera device 300, a spraying device 400, and a detecting device 500. The camera device 300, the spraying device 400, and the detecting device 500 are sequentially arranged above the conveying device 100, and correspond in position to different areas of the conveying device 100.

Moreover, the conveying device 100, the camera device 300, and the detecting device 500 in the present embodiment are fastened to the stand 200, and the spraying device 400 is fastened to a place (e.g., ground) outside of the stand 200, but the present disclosure is not limited thereto. In other embodiments of the present disclosure, the conveying device 100, the camera device 300, and the detecting device 500 can be fastened to a place (e.g., ground) outside of the stand 200, or the spraying device 400 can be fastened to the stand 200.

It should be noted that, the conveying device 100 in the present embodiment is cooperated with the stand 200, the camera device 300, the spraying device 400, and the detecting device 500, but the present disclosure is not limited thereto. In other embodiments of the present disclosure, if the conveying device 100 is used to transport a DUT (e.g., an outsole), the conveying device 100 can be independently applied or can be cooperated with other devices. The following description discloses the structure and connection relationship of each component of the production apparatus 1000.

Figure 2:
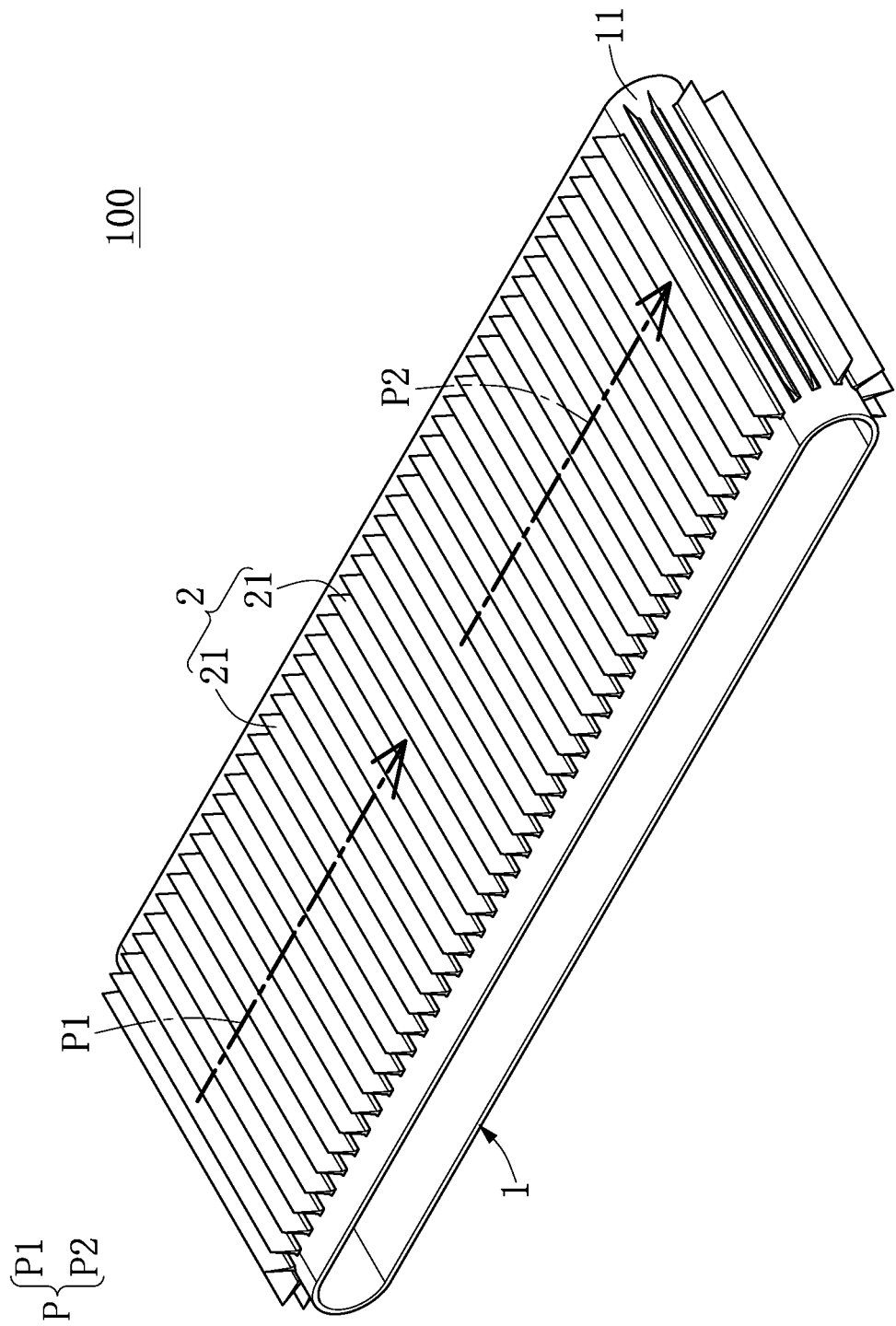
FIG. 2 is a perspective view showing a conveying device of the production apparatus.
Figure 3:
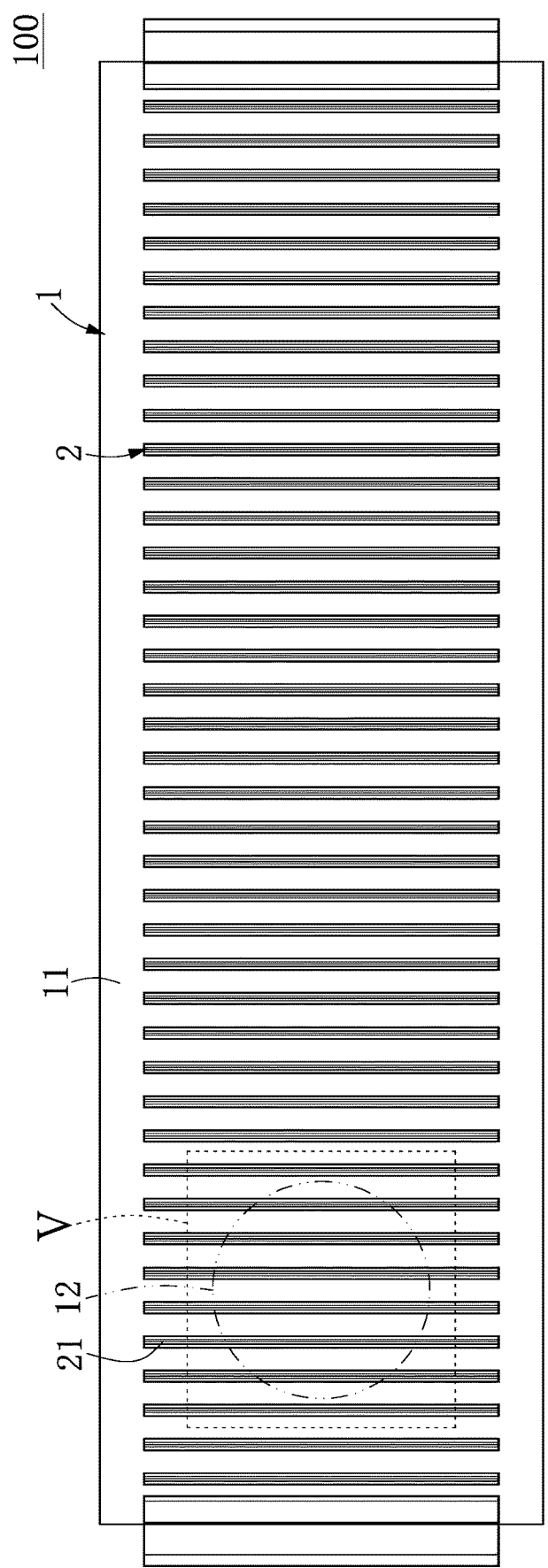
FIG. 3 is a top view of FIG. 2.
Figure 4:
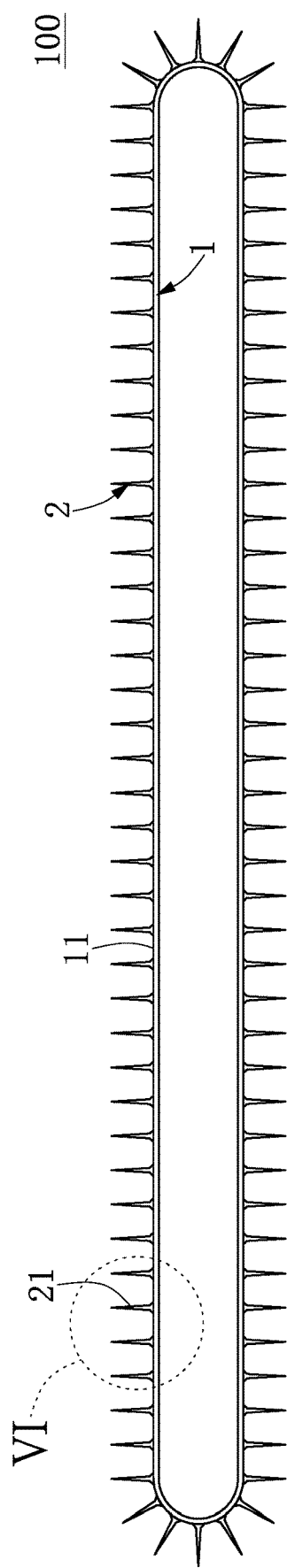
FIG. 4 is a side view of FIG. 2.

As shown in FIG. 2 to FIG. 4, the conveying device 100 includes a conveyor 1, a carrying member 2 disposed on the conveyor 1, and a driving assembly (not shown) configured to drive the conveyor 1. The driving assembly may include a motor, a chain, and gears, and the driving assembly can move the conveyor 1 by receiving electricity from an external power source (not shown).

Figure 8:
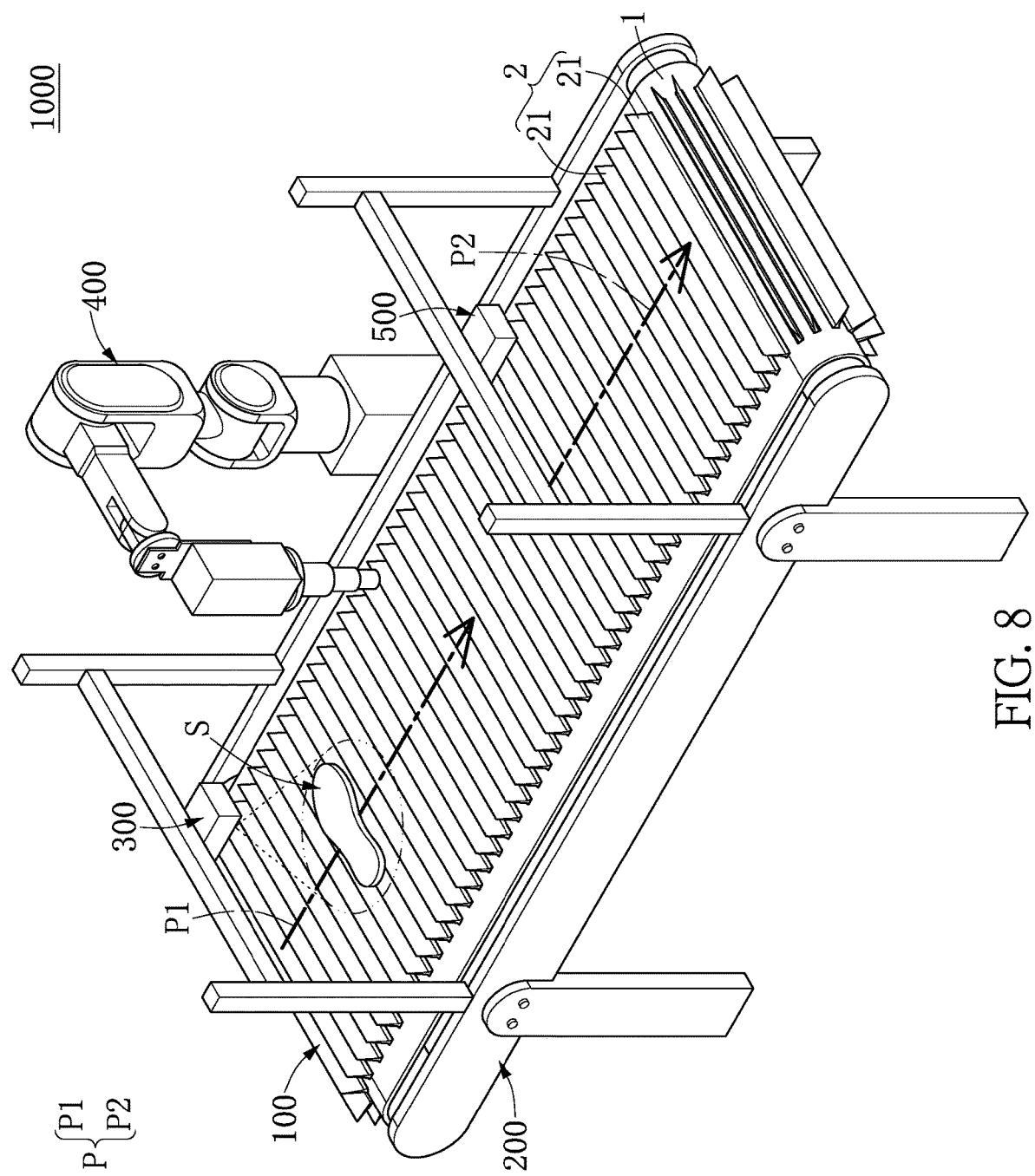
FIG. 8 is a perspective view showing a device under test (DUT) located on an upstream area of the production apparatus.

The conveyor 1 is disposed on the stand 200, and is movable along a transporting path P. The conveyor 1 in the present embodiment is arranged in a loop structure, and uses an upper half of the loop structure to cooperate with the other devices (e.g., the camera device 300, the spraying device 400, and the detecting device 500). The transporting path P sequentially defines an upstream area P1 and a downstream area P2. That is to say, the DUT located on the upstream area P1 (as shown in FIG. 8) can be moved toward the downstream area P2 through the movement of the conveyor 1, and the upstream area P1 and the downstream area P2 in the present embodiment are arranged on the upper half of the loop structure.

Moreover, an outer surface 11 of the conveyor 1 has a detecting region 12, and the detecting region 12 in the present embodiment corresponds in position to the capturing scope of the camera device 300. For example, the detecting region 12 is a portion of the outer surface 11 that can be captured by the camera device 300, but the present disclosure is not limited thereto.

It should be noted that, the conveyor 1 in the present embodiment is a single piece structure, but the present disclosure is not limited thereto. For example, in other embodiments of the present disclosure, the conveyor 1 can be formed by a plurality of pieces.

Figure 5:
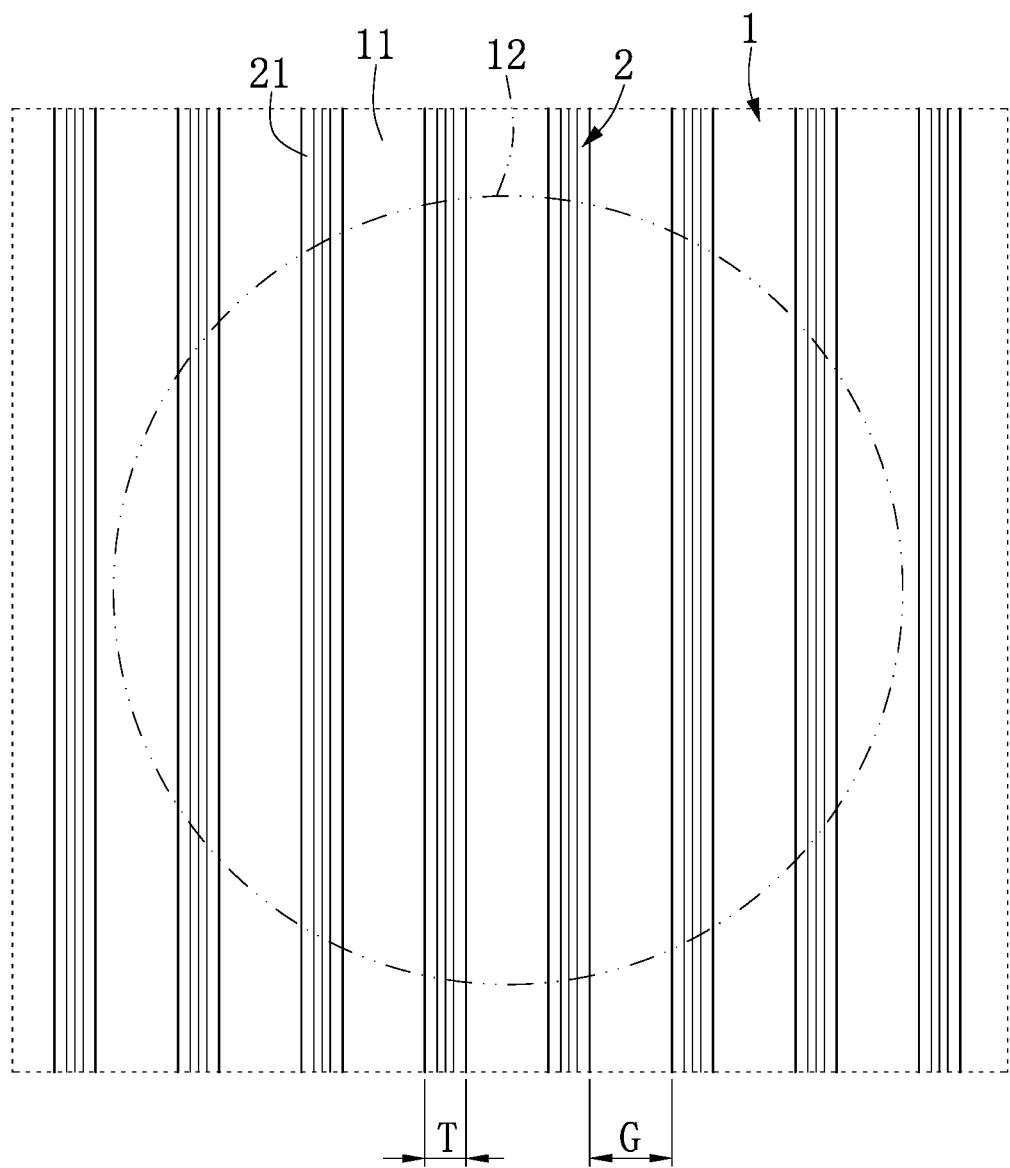
FIG. 5 is an enlarged view of portion V of FIG. 3.
Figure 6:
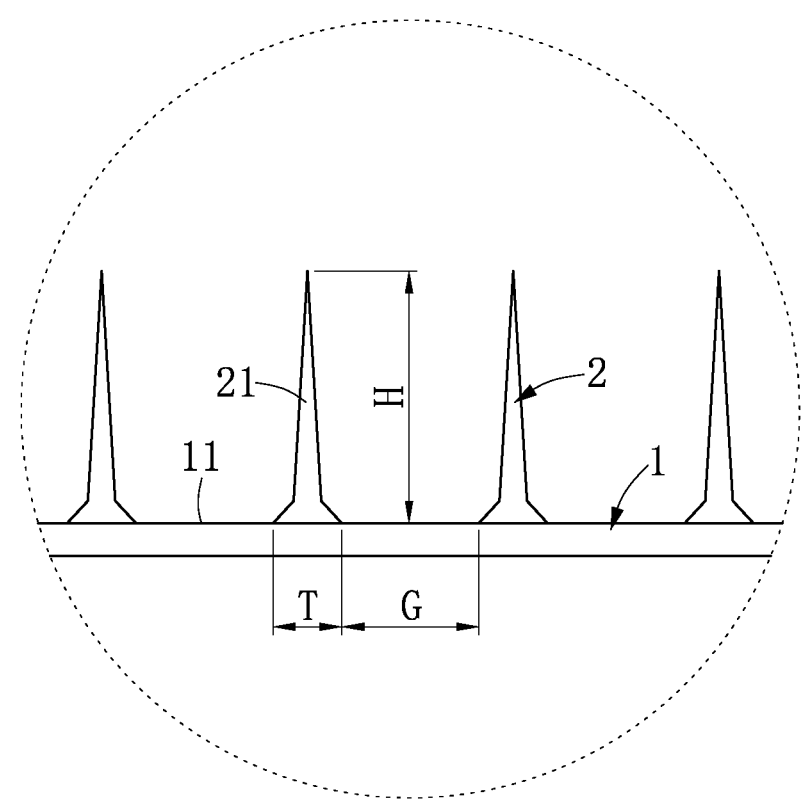
FIG. 6 is an enlarged view of portion VI of FIG. 4.

As shown in FIG. 5 and FIG. 6, the carrying member 2 is disposed on the outer surface 11 of the conveyor 1. In the present embodiment, the conveyor 1 and the carrying member 2 are made of different materials, and a bottom of the carrying member 2 is fixed on the outer surface 11 of the conveyor 1.

Moreover, in order to accurately recognize the detecting region 12 of the conveyor 1 by the camera device 300, the carrying member 2 preferably satisfies the following conditions, but the present disclosure is not limited thereto. A projected region defined by orthogonally projecting the carrying member 2 onto the detecting region 12 is smaller than or equal to 60% (e.g., 5%~60%) of an area of the detecting region 12. A height H of the carrying member 2 with respect to the outer surface 11 is larger than or equal to 3 mm, and is preferably within a range of 5 mm-20 mm.

It should be noted that, if the camera device 300 can accurately recognize the detecting region 12 of the conveyor 1, the structure of the carrying member 2 can be adjusted according to design requirements. The carrying member 2 in the present embodiment includes a plurality of carriers 21, but the present disclosure is not limited thereto. For example, in other embodiments of the present disclosure, the carrying member 2 can be a single piece structure.

As shown in FIG. 5 and FIG. 6, each of the carriers 21 is an elongated structure, and a cross-section of each of the carriers 21 parallel to the outer surface 11 gradually decreases along a direction away from the outer surface 11 (e.g., a direction from bottom to top shown in FIG. 5), but the present disclosure is not limited thereto.

Moreover, as shown in FIG. 2 and FIG. 5, longitudinal directions of the carriers 21 are parallel to each other. The longitudinal direction of each of the carriers 21 is perpendicular to the transporting path P, and is parallel to the outer surface 11 of the conveyor 1. Specifically, the carriers 21 are spaced apart from each other by the same distance, and a distance G between any two of the carriers 21 adjacent to each other is preferably larger than a maximum thickness T of each of the carriers 21 in the transporting path P, so that the camera device 300 can more clearly recognize the detecting region 12 of the conveyor 1, but the present disclosure is not limited thereto.

Figure 7:
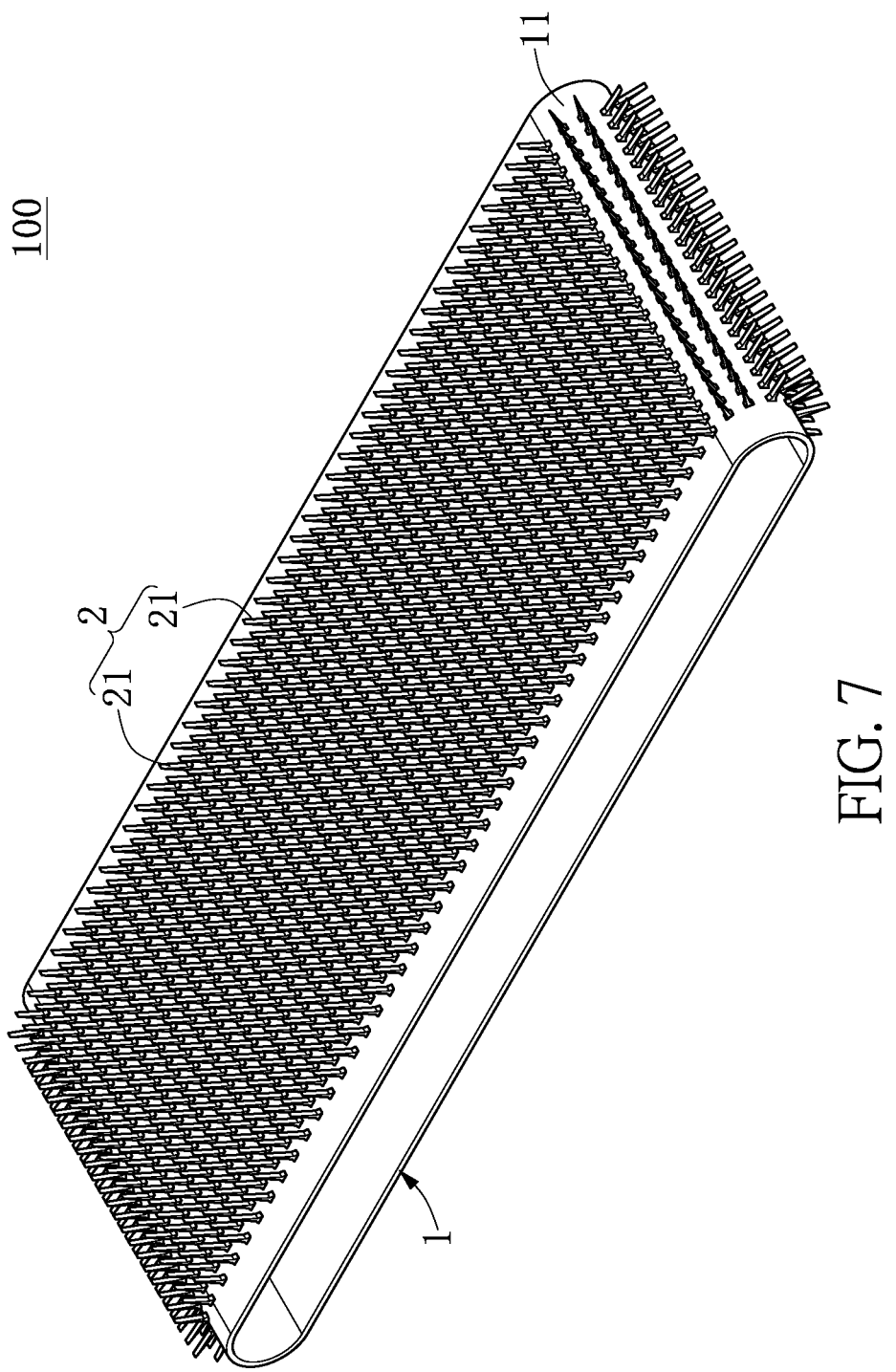
FIG. 7 is a perspective view showing the conveying device in another configuration.

In addition, the carrier 21 can be formed in other structures. As shown in FIG. 7, each of the carriers 21 can be a pillar, and the carriers 21 are fixed on the outer surface 11 of the conveyor 1 and are spaced apart from each other.

As shown in FIG. 1, the camera device 300 is arranged above the upstream area P1 of the conveyor 1. In the present embodiment the camera device 300 is directly above the upstream area P1 of the conveyor 1, thereby accurately capturing images of the conveying device 100 and the DUT. The DUT in the present embodiment is an outsole S, but the present disclosure is not limited thereto.

Figure 9:
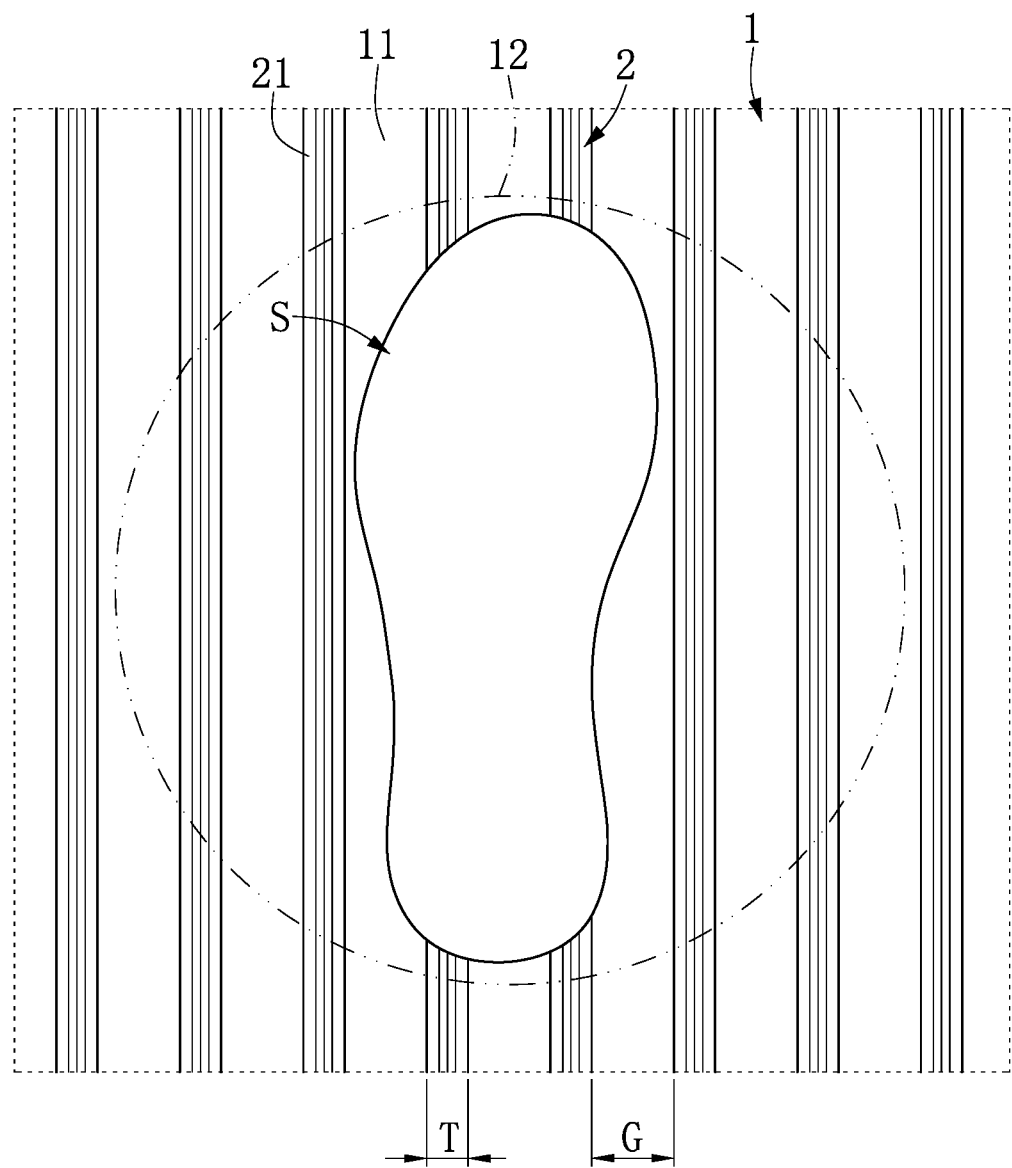
FIG. 9 is an enlarged top view of a part of FIG. 8.
Figure 10:
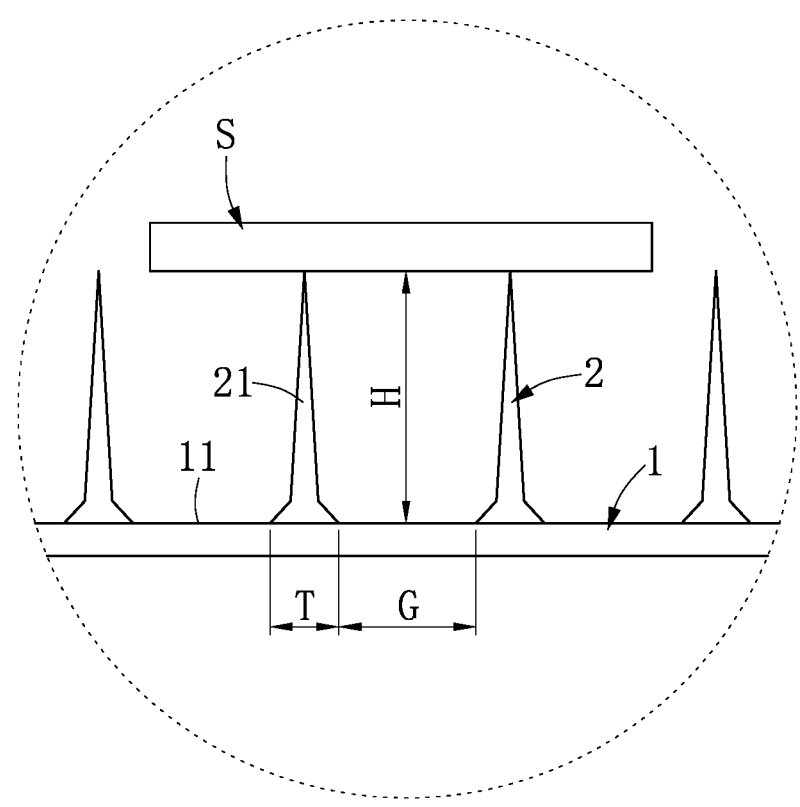
FIG. 10 is an enlarged side view of the part of FIG. 8.

Specifically, as shown in FIG. 8 to FIG. 10, when the outsole S is disposed on the carrying member 2, the camera 300 is configured to generate a depth image by capturing images of the outsole S, a portion of the detecting region 12, and a portion of the carrying member 2, the latter two of which are located around the outsole S. In the depth image, the conveyor 1 and the carrying member 2 can be clearly different from the outsole S by having certain characteristics (e.g., the projected region of the carrying member 2 is smaller than 60% of the area of the detecting region 12, the height H of the carrying member 2 is larger than or equal to 3 mm, the cross-section of each of the carriers 21 is tapered, and the distance G between any two adjacent carriers 21 is larger than the maximum thickness T of each of the carriers 21), so that a portion of the depth image related to the outsole S can be easily recognized.

Figure 11:
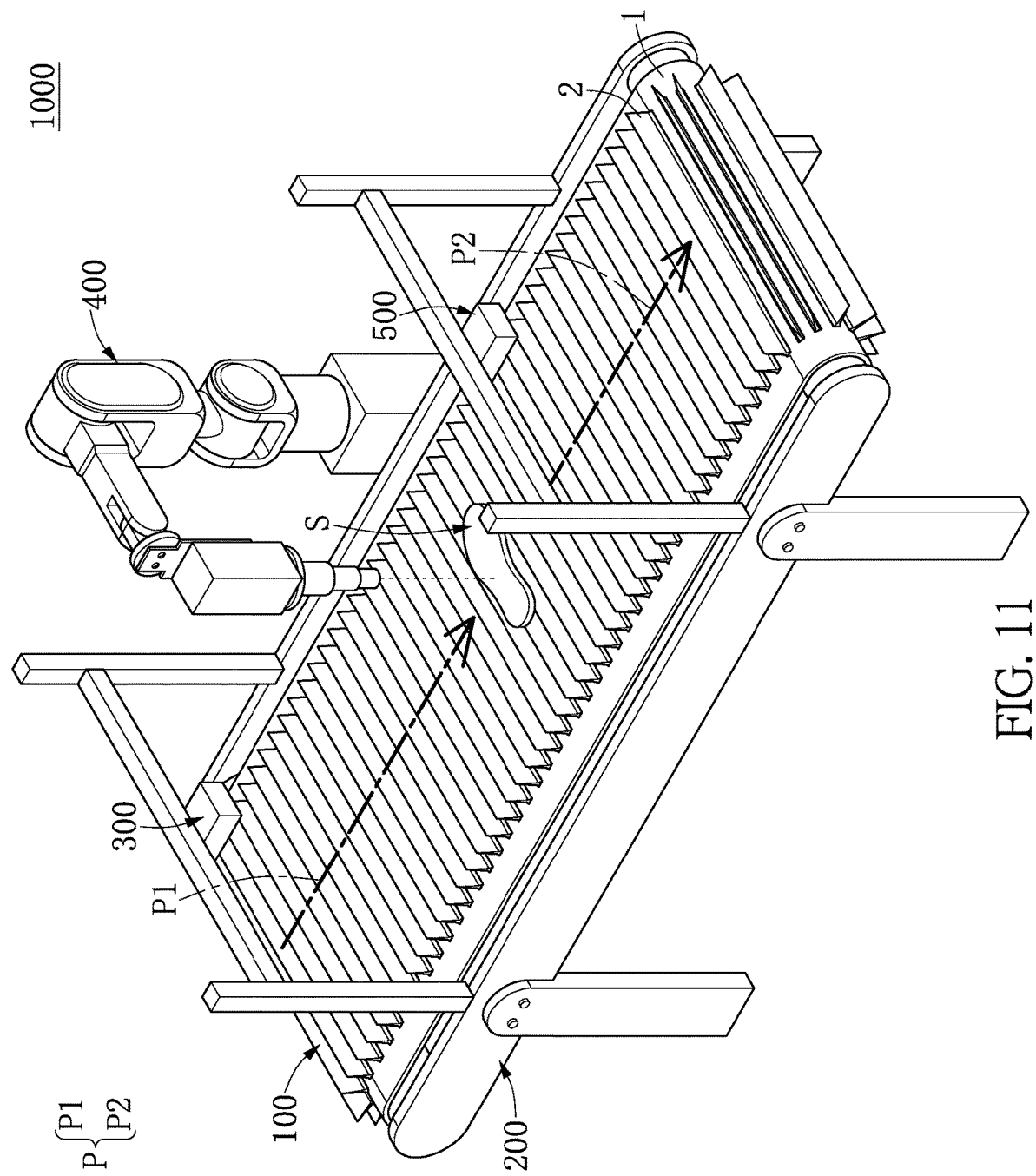
FIG. 11 is a perspective view showing the DUT located between the upstream area and a downstream area of the production apparatus.

As shown in FIG. 11, the spraying device 400 is arranged above a portion of the conveyor 1 between the upstream area P1 and the downstream area P2, and the spraying device 400 is configured to spray the outsole S according to the depth image. It should be noted that, the spraying device 400 in the present embodiment is a robotic arm having a sprayer, but the present disclosure is not limited thereto.

Figure 12:
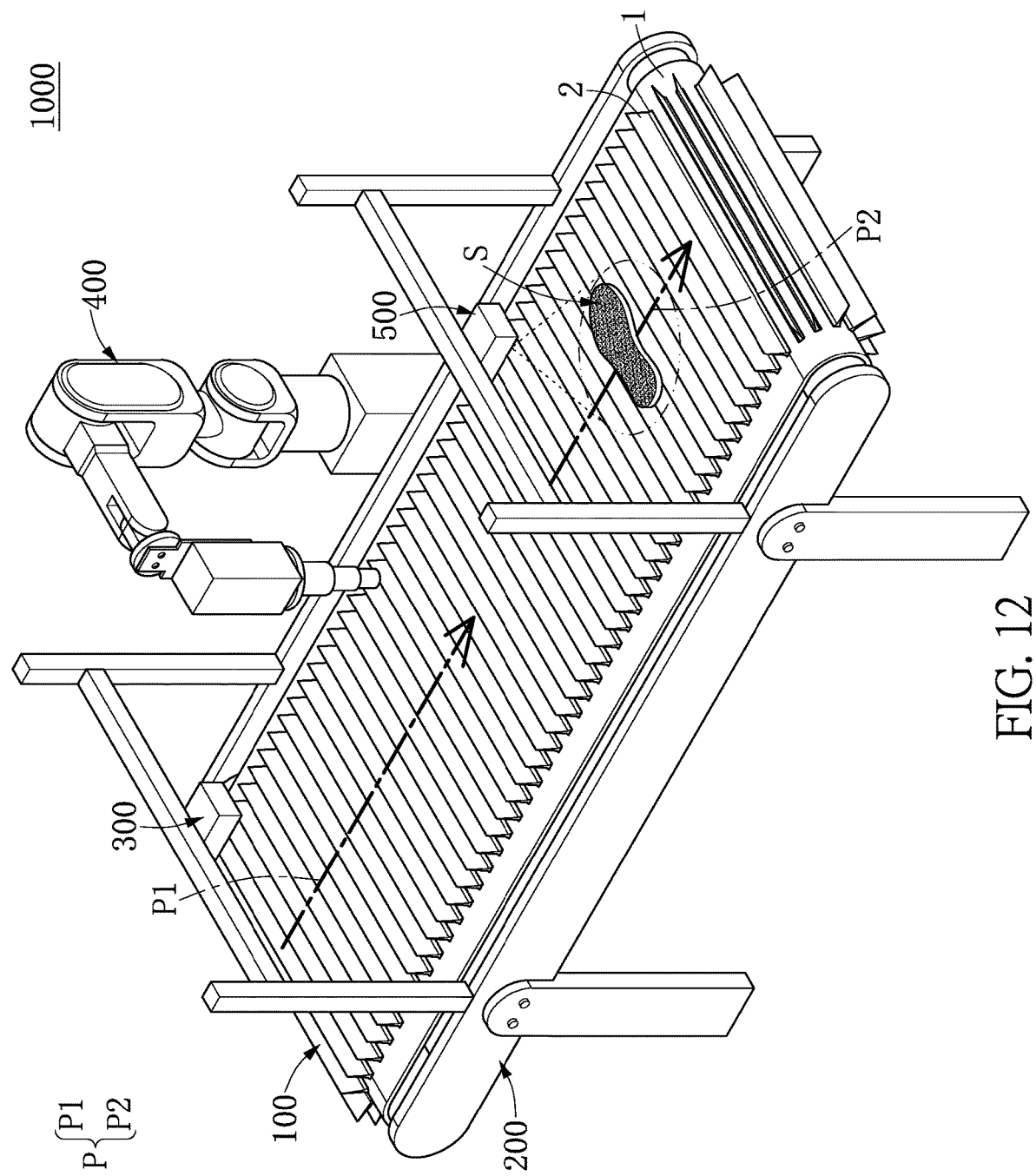
FIG. 12 is a perspective view showing the DUT located on the downstream area of the production apparatus.

As shown in FIG. 12, the detecting device 500 is arranged above the downstream area P2 of the conveyor 1. The detecting device 500 in the present embodiment is directly above the downstream area P2 of the conveyor 1, thereby accurately capturing images of the conveying device 100 and the DUT. Specifically, as shown in FIG. 11 and FIG. 12, after the spraying device 400 sprays the outsole S, the detecting device 500 is configured to check whether the outsole S satisfies a predetermined condition.

In addition, in other embodiments of the present disclosure, the production apparatus 1000 can be provided with other devices that include a flipping device for flipping the outsole S or a sorting device for sorting the outsole S according to the detecting device 500.

In conclusion, the production apparatus and the conveying device thereof in the present disclosure can allow the camera device 300 to clearly recognize a device under test (e.g., an outsole S) disposed on the carrying member 2 by the cooperation of the conveyor 1 and the carrying member 2, so that the manufacturing yield and production efficiency of the DUT can be improved by a depth image from the camera device 300.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A production apparatus with depth image detection, comprising:
   a stand;
   a conveying device disposed on the stand, and the conveying device including:
      a conveyor disposed on the stand and movable along a transporting path, wherein an outer surface of the conveyor has a detecting region, and the transporting path sequentially defines an upstream area and a downstream area; and
      a carrying member disposed on the outer surface of the conveyor, wherein a projected region defined by orthogonally projecting the carrying member onto the detecting region is smaller than or equal to 60% of an area of the detecting region, and a height of the carrying member with respect to the outer surface is larger than or equal to 3 mm; and
   a camera device arranged above the upstream area of the conveyor, wherein when a device under test (DUT) is disposed on the carrying member, the camera is configured to generate a depth image by capturing images of the DUT, a portion of the detecting region around the DUT, and a portion of the carrying member around the DUT.

2. The production apparatus according to claim 1, wherein the projected region defined by orthogonally projecting the carrying member onto the detecting region is 5% 60% of the area of the detecting region.

3. The production apparatus according to claim 1, wherein the height of the carrying member with respect to the outer surface is within a range of 5 mm-20 mm.

4. The production apparatus according to claim 1, wherein the carrying member includes a plurality of carriers disposed on the outer surface of the conveyor, the carriers are spaced apart from each other, and a cross-section of each of the carriers parallel to the outer surface gradually decreases along a direction away from the outer surface.

5. The production apparatus according to claim 1, wherein the carrying member includes a plurality of elongated carriers disposed on the outer surface of the conveyor, the carriers are parallel to each other, and a longitudinal direction of each of the carriers is perpendicular to the transporting path and is parallel to the outer surface of the conveyor.

6. The production apparatus according to claim 5, wherein the carriers are spaced apart from each other by the same distance, and a distance between any two of the carriers is larger than a maximum thickness of each of the carriers in the transporting path.

7. The production apparatus according to claim 1, wherein the conveyor and the carrying member are made of different materials, and a bottom of the carrying member is fixed on the outer surface of the conveyor.

8. The production apparatus according to claim 1, further comprising:
   a spraying device arranged above a portion of the conveyor between the upstream area and the downstream area, wherein the spraying device is configured to spray the DUT according to the depth image; and
   a detecting device arranged above the downstream area of the conveyor, wherein after the spraying device sprays the DUT, the detecting device is configured to check whether the DUT satisfies a predetermined condition.

* * * * *